(12) United States Patent
Feng et al.

(10) Patent No.: US 8,411,260 B1
(45) Date of Patent: Apr. 2, 2013

(54) LIGHT MONITOR CONFIGURED TO TAP PORTION OF LIGHT SIGNAL FROM MID-WAVEGUIDE

(75) Inventors: Dazeng Feng, El Monte, CA (US); Mehdi Asghari, Pasadena, CA (US); Bradley Jonathan Luff, San Marino, CA (US); Roshanak Shafiiha, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 314 days.

(21) Appl. No.: 12/804,769

(22) Filed: Jul. 28, 2010

(51) Int. Cl.
*G01N 21/00* (2006.01)
(52) U.S. Cl. ...................................... 356/73.1
(58) Field of Classification Search ................... 356/73.1
See application file for complete search history.

(56) References Cited

U.S. PATENT DOCUMENTS

| | | |
|---|---|---|
| 6,433,399 B1 | 8/2002 | Polman |
| 6,885,795 B1 * | 4/2005 | Hsu et al. ........................ 385/48 |
| 7,251,408 B1 | 7/2007 | Gunn |
| 7,386,207 B2 | 6/2008 | Knights |
| 2004/0179806 A1 | 9/2004 | Block et al. |
| 2005/0212068 A1 | 9/2005 | Leon |
| 2006/0039666 A1 | 2/2006 | Knights |
| 2007/0053643 A1 | 3/2007 | West |
| 2008/0272391 A1 | 11/2008 | Kapur |
| 2011/0068425 A1 * | 3/2011 | Liao et al. ..................... 257/432 |

OTHER PUBLICATIONS

International Search Report and Written Opinion of the International Search Authority as extracted from PCT/US2011/001010, Nov. 9, 2011.

* cited by examiner

*Primary Examiner* — Tu Nguyen
(74) *Attorney, Agent, or Firm* — Gavrilovich, Dodd & Lindsey, LLP (57) ABSTRACT

The device includes a waveguide on a base. A light-absorbing portion of the waveguide receives a light signal, absorbs a portion of the light signal and guides a transmitted portion of the light signal to the output portion of the waveguide. A light-absorbing portion of the waveguide is partially defined by a light-absorbing medium that has lateral sides that each extends between a top side and a bottom side of the light-absorbing medium. The device also includes a monitor absorption of the absorbed portion of the light signal. The monitor includes field sources that are each configured to serve as a source of an electrical field in the light-absorbing medium. The field sources each contacts one of the lateral sides of the light-absorbing medium.

20 Claims, 10 Drawing Sheets

LIGHT MONITOR CONFIGURED TO TAP PORTION OF LIGHT SIGNAL FROM MID-WAVEGUIDE

FIELD

The present invention relates to optical devices and more particularly to devices having in-line light monitors.

BACKGROUND

The use of optical and/or optoelectronic devices is increasing in communications applications. During the operation of these devices it is often desirable to monitor the light traveling along a waveguide at a mid-point on the waveguide rather than at the end of the waveguide. A tap waveguide is often used for this purpose. A tap waveguide intersects a main waveguide that is carrying the light signal to be monitored. The tap waveguide extracts a small portion of that light signal from the main waveguide and then carries the extracted portion of the light signal to a light sensor positioned at an end of the tap waveguide. The output of the light sensor is then used to monitor the light signal on the main waveguide.

The presence of these tap waveguides can increase the size and/or complexity of optical and/or optoelectronic devices. However, it is desirable for the optical and/or optoelectronic devices used in communications devices to be reduced or minimized. As a result, there is a need for improved techniques for monitoring light signals traveling along a waveguide at a mid-point on the waveguide.

SUMMARY

The device includes a waveguide on a base. The waveguide includes an input portion, a light-absorbing portion, and an output portion. The input portion of the waveguide is configured to guide a light signal to the light-absorbing portion of the waveguide and is partially defined by a light-transmitting medium. The light-absorbing portion of the waveguide is configured to absorb a portion of the light signal and to guide a transmitted portion of the light signal to the output portion of the waveguide. Additionally, the light-absorbing portion of the waveguide is partially defined by a light-absorbing medium that is different from the light-transmitting medium. The light-absorbing medium has lateral sides that each extends between a top side and a bottom side of the light-absorbing medium with the bottom side being between the base and the top side of the light-absorbing medium. The output portion of the waveguide is configured to receive the transmitted portion of the light signal from the light-absorbing portion of the waveguide. Additionally, the output portion of the waveguide is configured to guide the transmitted portion of the light signal away from the light-absorbing portion of the waveguide. The output portion of the waveguide is partially defined by the light-transmitting medium. The device also includes a monitor positioned on the base. The monitor is configured to monitor absorption of the absorbed portion of the light signal. The monitor includes field sources that are each configured to serve as a source of an electrical field in the light-absorbing medium. The field sources each contact one of the lateral sides and the lateral sides that are contacted by the field sources are on opposing sides of the light-absorbing medium.

In some instances, the light-absorbing portion of the waveguide has a length less than 1 μm and the length is selected such that a power of the absorbed portion of the light signal is less than 5% of the power of the light signal.

In one embodiment, the light-absorbing medium includes a top side that defines a portion of the light-absorbing portion of the waveguide and the light-transmitting medium includes a top side that defines a portion of the input portion of the waveguide. In some instances, the top side of the light-absorbing medium is farther from the base than the top side of the light-transmitting medium.

BRIEF DESCRIPTION OF THE FIGURES

FIG. 1A through FIG. 1J illustrate an optical device having an optical monitor. The monitor includes field sources that are configured to generate a substantially horizontal electrical field in a light-absorbing medium. The device illustrated in FIG. 1A through FIG. 1J employs doped regions of the light-absorbing medium as the field sources. FIG. 1A is a perspective view of the device.

FIG. 5A through FIG. 14 illustrate a method of forming an optical device having a monitor constructed according to FIG. 1A through FIG. 1F, and FIG. 1J.

DESCRIPTION

The device includes a waveguide on a base. The waveguide includes an input portion, a light-absorbing portion, and an output portion. The input portion of the waveguide is configured to guide a light signal to the light-absorbing portion of the waveguide. The light-absorbing portion of the waveguide is configured to absorb a portion of the light signal and to guide a transmitted portion of the light signal to the output portion of the waveguide. The output portion of the waveguide is configured to receive the transmitted portion of the light signal from the light-absorbing portion of the waveguide and also to guide the transmitted portion of the light signal away from the light-absorbing portion of the waveguide. The device also includes a monitor positioned on the base. The monitor includes field sources that are each configured to serve as a source of an electrical field in the light-absorbing medium. In some instances, the field sources are configured to generate a bias electrical field in the light-absorbing portion of the waveguide. The resulting electrical field is substantially horizontal to the base.

The field sources can also be employed to monitor the electrical current through the light-absorbing portion of the waveguide. The presence of electrical current in the light-absorbing portion of the waveguide indicates the absorption of light signals. As a result, the monitor can be employed to monitor absorption of the absorbed portion of the light signal. Additionally, the length of the light-absorbing portion of the waveguide can be selected such that the light-absorbing medium absorbs less than 100%, 50%, 10%, or 5% of the power of the light signal guided by the input waveguide. Accordingly, a large portion of the light signal power continues past the monitor, is received by the output waveguide, and is guided away from the monitor.

The efficiency of the above arrangement allows the monitor to have a compact size. For instance, when the length of the light-absorbing portion of the waveguide is such that the light-absorbing medium absorbs less than 5% of the power of the light signal guided by the input waveguide, the light-absorbing portion of the waveguide can have a length less than 1 μm. This reduced length of the light-absorbing portion of the waveguide allows the light-absorbing portion of the waveguide to have a different cross-sectional area and/or shape than the input portion of the waveguide and/or the output portion of the waveguide. For instance, a top side of the light-absorbing medium in the light-absorbing portion of the waveguide can be located above the top side of the light-transmitting medium in the output waveguide and/or the input waveguide. The transition from the dimensions of the light-absorbing portion of the waveguide to the dimensions of the input waveguide and/or the output waveguide can be abrupt. For instance, the transition from the top of the light-absorbing portion of the waveguide to the top of the input waveguide and/or the output waveguide can be abrupt. These abrupt transitions are permissible because the level of divergence of the light signal in the light-absorbing medium is reduced as a result of the reduced length of the light-absorbing portion of the waveguide. Since there is little divergence in the light-absorbing portion of the waveguide, the loss associated with the abrupt transitions is reduced. These abrupt transitions can simplify the fabrication process. For instance, as will become apparent below, building the device with these abrupt transitions can eliminate one or more planarization steps from the fabrication process. Elimination of these steps can reduce the cost and/or complexity of the fabrication process and can increase the number of other fabrication steps that are possible.

Since this device does not depend on evanescent coupling to tap off some portion of the signal, the amount of polarization dependent loss (PDL) is also reduced. This is because in general the field intensities of light in the evanescent tails of modes within a waveguide are very polarization dependent, while this is not true for the field intensities in the center of the waveguide. The device described here interacts mainly with light in the center of the waveguide. As a result, the monitor can be in-line, compact, easier to fabricate, and have lower levels of PDL.

Figure 1A:
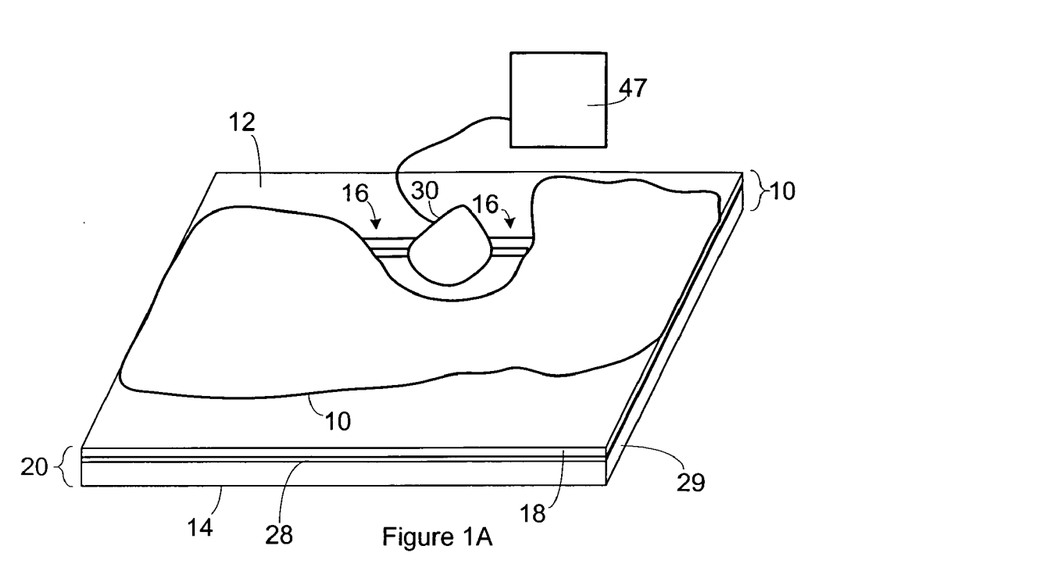
Figure 1B:
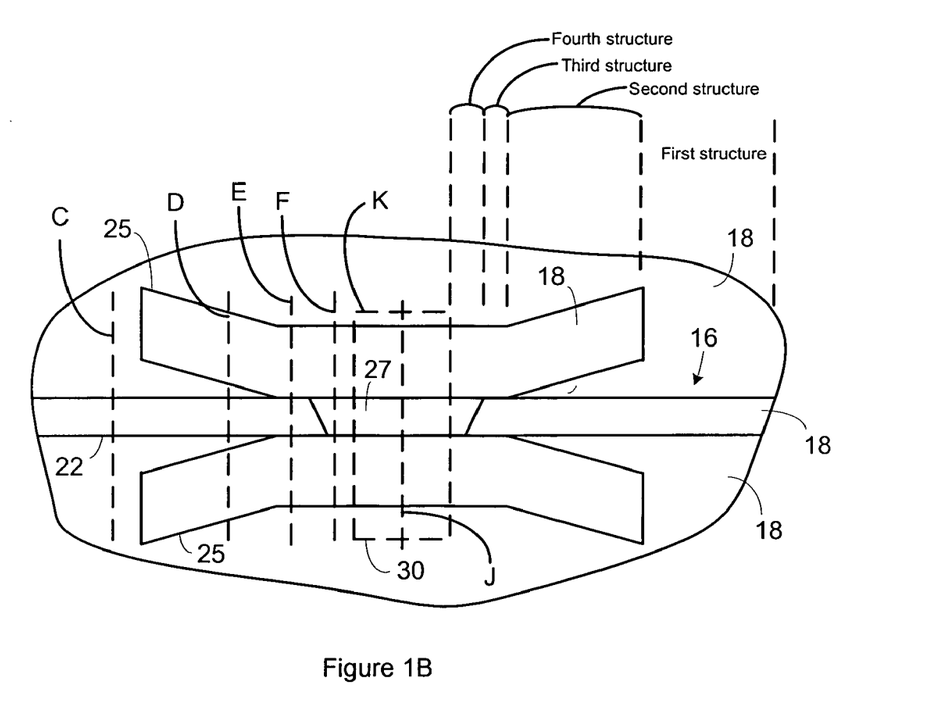
FIG. 1B is a topview of the portion of the optical device shown in FIG. 1A that includes the optical monitor.
Figure 1C:
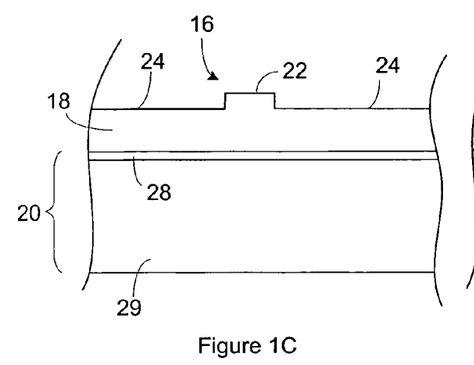
FIG. 1C is a cross-section of the device shown in FIG. 1B taken along the line labeled C.
Figure 1D:
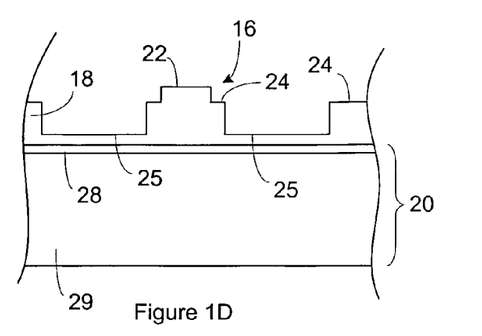
FIG. 1D is a cross-section of the optical device shown in FIG. 1B taken along the line labeled D.
Figure 1E:
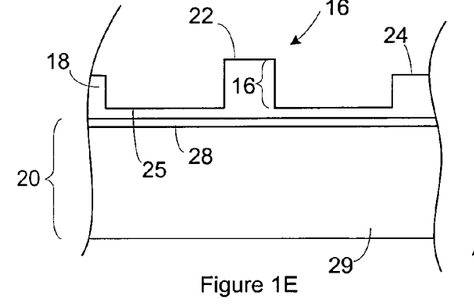
FIG. 1E is a cross-section of the optical device shown in FIG. 1B taken along the line labeled E.
Figure 1F:
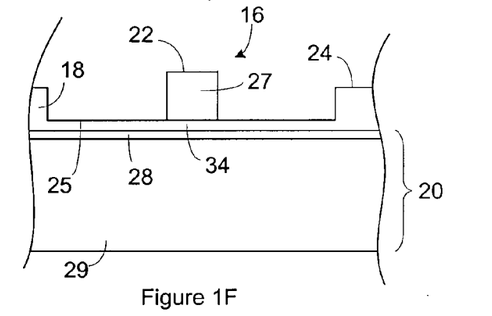
FIG. 1F is a cross-section of the optical device shown in FIG. 1B taken along the line labeled F.
Figure 1G:
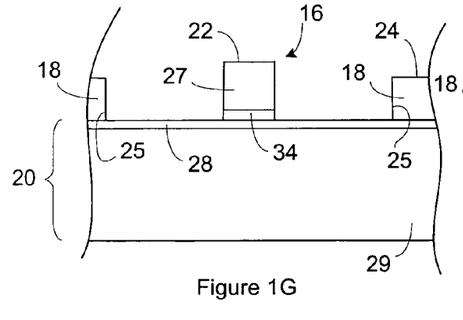
FIG. 1G is a cross-section of the optical device shown in FIG. 1B taken along the line labeled F.
Figure 1H:
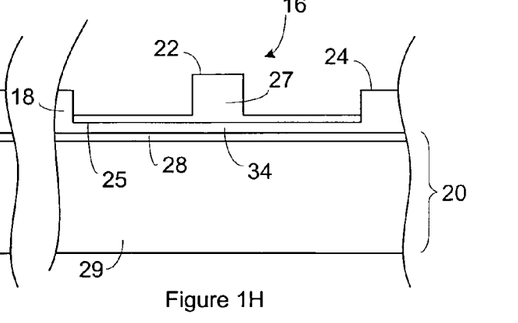
FIG. 1H is a cross-section of the optical device shown in FIG. 1B taken along the line labeled F. The embodiments shown in FIG. 1F, FIG. 1G, and FIG. 1H are alternative embodiments.
Figure 1J:
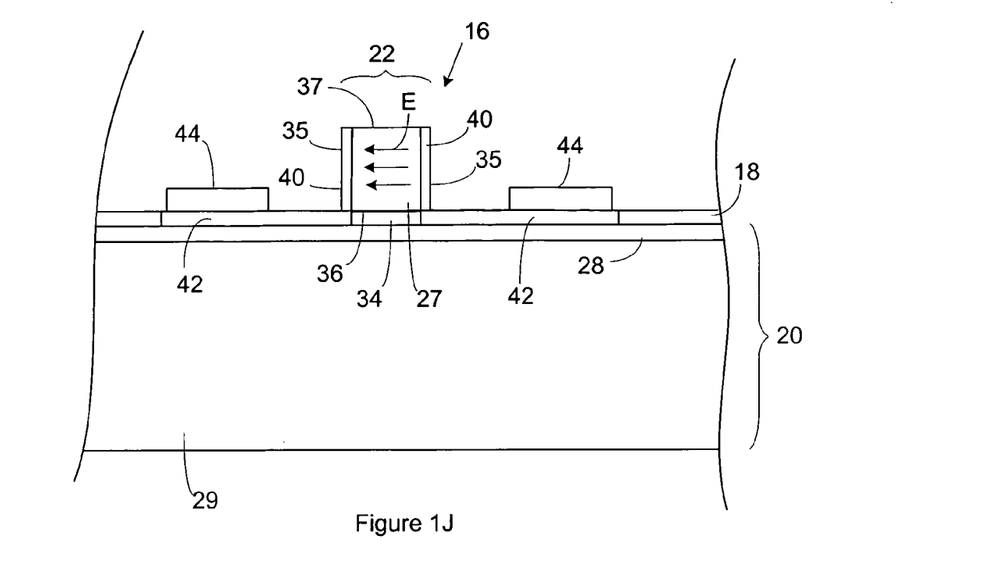
FIG. 1J is a cross-section of the optical device shown in FIG. 1B taken along the line labeled J. The cross section is through a monitor constructed on a waveguide having a structure according to FIG. 1F.

FIG. 1A through FIG. 1J illustrate an optical device having a waveguide that includes a light monitor positioned in line with the waveguide and configured to monitor light signals at a location mid-way along the waveguide. FIG. 1A is a perspective view of the device. FIG. 1B is a topview of the portion of the optical device shown in FIG. 1A that includes an optical monitor. FIG. 1C is a cross-section of the device shown in FIG. 1B taken along the line labeled C. FIG. 1D is a cross-section of the optical device shown in FIG. 1B taken along the line labeled D. FIG. 1E is a cross-section of the optical device shown in FIG. 1B taken along the line labeled E. FIG. 1F is a cross-section of the optical device shown in FIG. 1B taken along the line labeled F. FIG. 1G is a cross-section of the optical device shown in FIG. 1B taken along the line labeled F. FIG. 1H is a cross-section of the optical device shown in FIG. 1B taken along the line labeled F. The embodiments shown in FIG. 1F, FIG. 1G, and FIG. 1H are alternative embodiments. FIG. 1J is a cross-section of the optical device shown in FIG. 1B taken along the line labeled J.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a light signal, monitors that convert a light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region of the light-transmitting medium as shown in FIG. 1C. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. One or more cladding layers (not shown) are optionally positioned on the light-transmitting medium. The one or more cladding layers can serve as a cladding for the waveguide 16 and/or for the device. When the light-transmitting medium 18 is silicon, suitable cladding layers include, but are not limited to, polymers, silica, and SiN.

Recesses 25 (FIG. 1B) extend into the slab regions such that the ridge 22 is positioned between recesses 25. The recesses 25 can extend only part way into the light-transmitting medium 18. As is evident from FIG. 1D, the recesses 25 can be spaced apart from the ridge 22. As a result, a portion of the waveguide 16 includes a second structure where an upper portion of the waveguide 16 is partially defined by the ridge 22 extending upward from the slab region and a lower portion of the waveguide is partially defined by recesses 25 extending into the slab regions and spaced apart from the ridge.

As shown in FIG. 1E, the recesses 25 can approach the ridge 22 such that the sides of the ridge 22 and the sides of the recesses 25 combine into a single surface 26. As a result, a portion of a waveguide includes a third structure where the waveguide is partially defined by the surface 26.

As is evident in FIG. 1B, a portion of the waveguide includes a light-absorbing medium 27. The light-absorbing medium 27 is configured to receive the light signals from a portion of the waveguide having the third structure and to guide the received light signals to another portion of the waveguide having the third structure.

The light-absorbing medium 27 extends upward from the bottom of the recesses 25. The light-absorbing medium 27 is configured to guide the light signals. For instance, as is evident in FIG. 1F, a portion of a waveguide includes a fourth structure where the waveguide is partially defined by the top and lateral sides of the light-absorbing medium 27.

In FIG. 1F, the light-absorbing medium 27 is positioned on a seed portion 34 of the light-transmitting medium 18. The seed portion 34 of the light-transmitting medium 18 is positioned on the base 20. In particular, the seed portion 34 of the light-transmitting medium 18 contacts the insulator 28. In some instances, when the light signal travels from the light-transmitting medium into the light-absorbing medium 27, a portion of the light signal enters the seed portion 34 of the light-transmitting medium 18 and another portion of the light signal enters the light-absorbing medium 27. During the fabrication of the device, the seed portion 34 of the light-transmitting medium 18 can be used to grow the light-absorbing medium 27. For instance, when the light-transmitting medium 18 is silicon and the light-absorbing medium 27 is germanium-silicon, the light-absorbing medium 27 can be grown on the silicon. As a result, the use of the light-transmitting medium 18 in both the waveguides 16 and as a seed layer for growth of the light-absorbing medium 27 can simplify the process for fabricating the device.

FIG. 1G is an alternative to the fourth structure illustrated in FIG. 1F. In FIG. 1G, the light-absorbing medium 27 is positioned on a seed portion 34 of the light-transmitting medium 18 without the seed portion 34 of the light-transmitting medium 18 extending substantially beyond the lateral sides of the light-absorbing medium 27. Additionally, the slab regions of the light-transmitting medium 18 are not present adjacent to the ridge of the light-absorbing medium 27. Accordingly, a portion of a waveguide includes a fourth structure where the waveguide is partially defined by the top and lateral sides of the light-absorbing medium 27. In some instances, when the light signal travels from the light-transmitting medium into the light-absorbing medium 27, a portion of the light signal enters the seed portion 34 of the light-transmitting medium 18 and another portion of the light signal enters the light-absorbing medium 27. As described above, the light-absorbing medium 27 can be grown on the seed portion of the light-transmitting medium 18.

FIG. 1H is an alternative to the fourth structure illustrated in FIG. 1F and FIG. 1G. In FIG. 1H, a ridge 22 of light-absorbing medium 27 extends upward from a slab region of the light-absorbing medium 27. Accordingly, a portion of a waveguide includes a fourth structure where the waveguide is partially defined by the top and lateral sides of the light-absorbing medium 27. The slab regions of the light-absorbing medium 27 and the ridge 22 of the light-absorbing medium 27 are both positioned on a seed portion 34 of the light-transmitting medium 18. As a result, the seed portion 34 of the light-transmitting medium 18 is between the light-absorbing medium 27 and the base 20. In some instances, when the light signal travels from the light-transmitting medium into the light-absorbing medium 27, a portion of the light signal enters the seed portion 34 of the light-transmitting medium 18 and another portion of the light signal enters the light-absorbing medium 27. As described above, the light-absorbing medium 27 can be grown on the seed portion of the light-transmitting medium 18.

As is evident in FIG. 1B, there is an interface between each facet of the light-absorbing medium 27 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 28 with a lower index of refraction than the light-transmitting medium 18. The drop in the index of refraction can cause reflection of a light signal from the light-transmitting medium 18 back into the light-transmitting medium 18. The base 20 can include the optical insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 28 and the silicon substrate can serve as the substrate 29.

The optical device includes a monitor 30. The location of the monitor on the optical device is illustrated by the line labeled K in FIG. 1B. Although FIG. 1B shows the light-absorbing medium 27 extending beyond the monitor, the perimeter of the monitor can extend to the perimeter of the light-absorbing medium 27.

In FIG. 1B, the details of the monitor construction are not shown in FIG. 1B. However, the monitor construction is evident from other illustrations such as FIG. 1J. FIG. 1J is a cross-section of the optical device shown in FIG. 1B taken along the line labeled J. The monitor of FIG. 1J can be constructed on the portion of the waveguide having a fourth structure constructed according to FIG. 1F. The monitor is configured such that during operation of the monitor, an electric field is applied to the light-absorbing medium 27 such that the electric field is substantially parallel to the base 20.

The light-absorbing medium 27 can include lateral sides 35 that connect a bottom side 36 and a top side 37. The bottom side is located between the top side and the base 20. In some instances, the lateral sides are substantially perpendicular relative to the base 20.

The lateral sides of the light-absorbing medium 27 can include doped regions 40. As is evident from FIG. 1J, each of the doped regions 40 can extend up to the top side of the light-absorbing medium 27. Each of the doped regions 40 can be an N-type doped regions or a P-type doped region. For instance, each of the N-type doped regions can include an N-type dopant and each of the P-type doped regions can include a P-type dopant. In some instances, the light-absorbing medium 27 includes a doped region 40 that is an N-type doped region and a doped region 40 that is a P-type doped region. The separation between the doped regions 40 in the light-absorbing medium 27 results in the formation of PIN (p-type region-insulator-n-type region) junction in the monitor 30.

In the light-absorbing medium 27, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

The light-transmitting medium 18 also includes doped regions 42. Each doped region 42 in the light-transmitting medium 18 contacts one of the doped regions 40 in the light-absorbing medium 27. A doped region 42 in the light-transmitting medium 18 and the contacted doped region 40 are the same type of doped region. For instance, when a doped region 40 in the light-absorbing medium 27 is a P-type region, that doped region 40 contacts a P-type doped region in the light-transmitting medium 18. As a result, in some instances, one of the doped regions 42 in the light-transmitting medium 18 is a P-type doped region and one of the doped regions 42 in the light-transmitting medium 18 is an N-type doped region.

In the light-transmitting medium 18, suitable dopants for N-type regions include, but are not limited to, phosphorus and/or arsenic. Suitable dopants for P-type regions include, but are not limited to, boron. The doped regions 42 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Each doped region 42 in the light-transmitting medium 18 is in contact with an electrical conductor 44 such as a metal. Accordingly, each of the doped regions 42 in the light-transmitting medium 18 provides electrical communication between an electrical conductor 44 and one of the doped regions 40 in the light-absorbing medium 27. As a result, electrical energy can be applied to the electrical conductors 44 in order to apply the electric field to the light-absorbing medium 27. As is evident from the arrows labeled E in FIG. 1J, the doped regions 40 in the light-absorbing medium 27 serve as the field sources for the electrical field. As a result, the resulting electrical field is substantially parallel to the base 20.

Figure 2A:
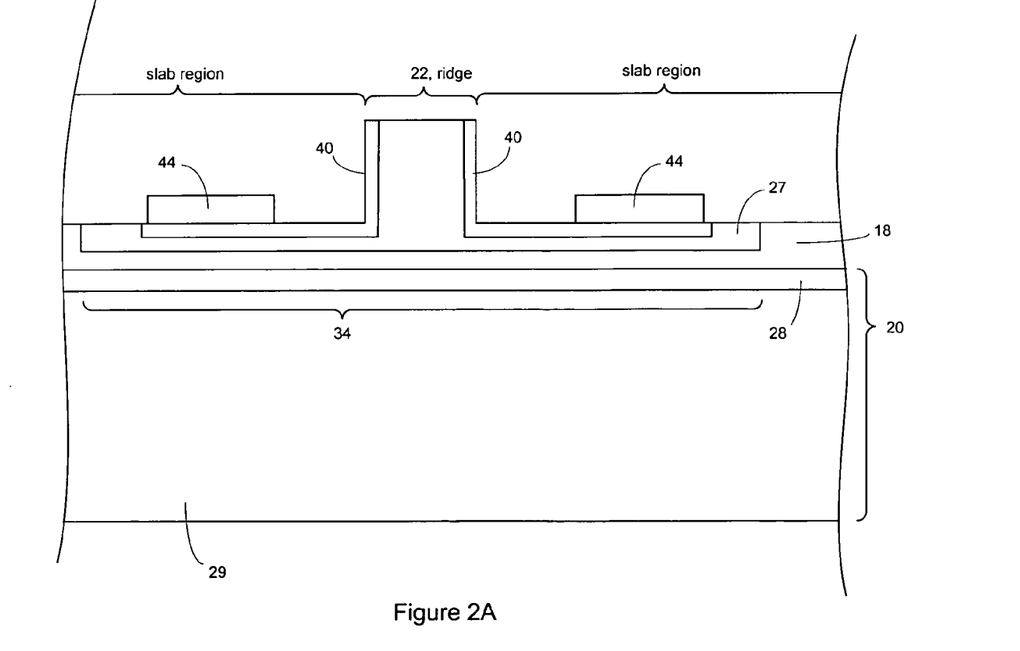
FIG. 2A is a cross section of an embodiment of a monitor that can be constructed on a waveguide having a structure constructed according to FIG. 1H.

FIG. 2A presents another construction of the monitor that can simplify the fabrication process. The monitor of FIG. 2A can be constructed on the portion of the waveguide having a fourth structure constructed according to FIG. 1H.

A ridge 22 of light-absorbing medium 27 extends upward from a slab region of the light-absorbing medium 27. The doped regions 40 are both in the slab regions of the light-absorbing medium 27 and also in the ridge of the light-absorbing medium 27. For instance, doped regions 40 of the light-absorbing medium 27 are positioned on the lateral sides of the ridge 22 of the light-absorbing medium 27. Additionally, the doped regions 40 extend from the ridge 22 into the slab region of the light-absorbing medium 27. The transition of a doped region 40 from the ridge 22 of the light-absorbing medium 27 into the slab region of the light-absorbing medium 27 can be continuous and unbroken as shown in FIG. 2A.

Electrical conductors 44 are positioned on the slab region of the light-absorbing medium 27. In particular, the electrical conductors 44 each contact a portion of a doped region 40 that is in the slab region of the light-absorbing medium 27.

The arrangement of FIG. 2A may have a simplified fabrication process relative to an arrangement such as illustrated in FIG. 1J. For instance, in FIG. 1J, doped regions 40 are formed in the light-transmitting medium 18 and also in the light-absorbing medium 27. Different conditions may be required to form these regions in the different materials. For instance, when the light-transmitting medium 18 is silicon and the light-absorbing medium 27 is germanium-silicon, it may be desirable to use different temperatures to form the doped regions 40 in the light-absorbing medium 27 than is used to form the doped regions 42 in the light-transmitting medium 18. However, since the arrangement of FIG. 2A requires that the doped regions be formed only in the light-absorbing medium, the arrangement of FIG. 2A may be simpler to fabricate.

Although FIG. 2A illustrates each of the doped regions extending only part way into slab regions of the light-absorbing medium, one or more of the doped regions can extend through the slab regions of the light-absorbing medium. Accordingly, one or more of the doped regions can contact the light-transmitting medium 18. Further, one or more of the doped regions can extend through the slab regions of the light-absorbing medium and into the light-transmitting medium 18.

Figure 2B:
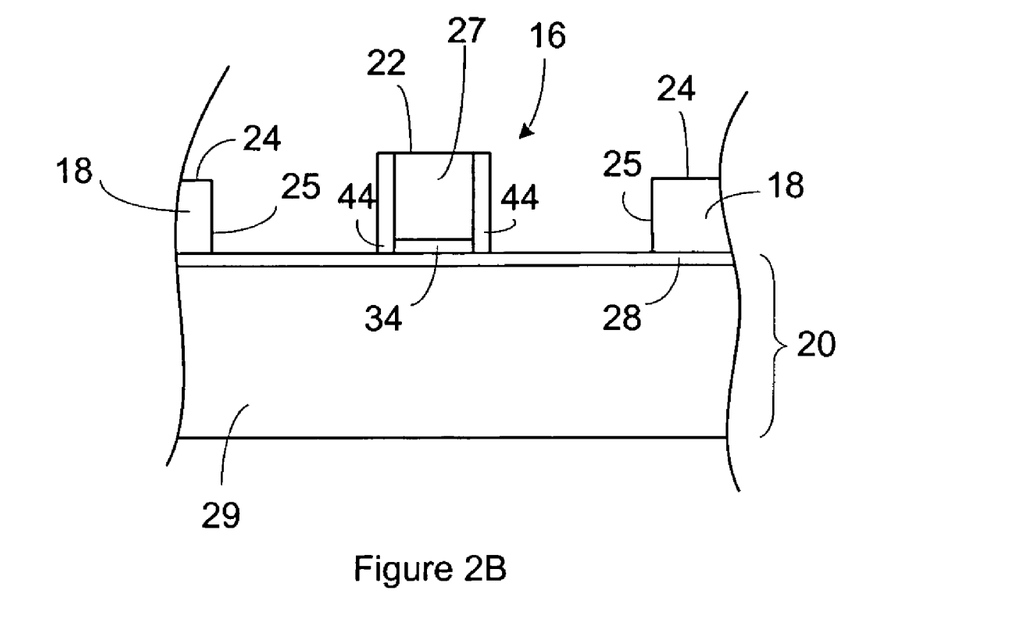
FIG. 2B is a cross section of an embodiment of a monitor that can be constructed on a waveguide having a structure constructed according to FIG. 1G.

Rather than using doped regions 40 in the light-absorbing medium 27 as the field sources, electrical conductors 44 such as metal can be used as the field sources. For instance, FIG. 2B is a cross-section of a monitor that employs electrical conductors 44 as field sources. The monitor of FIG. 2B can be constructed on the portion of the waveguide having a fourth structure constructed according to FIG. 1G. The electrical conductors 44 extend from the base 20 to the top side of the light-absorbing medium 27. For instance, FIG. 2B illustrates the electrical conductors 44 extending from the insulator 28 to the top side of the light-absorbing medium 27. The seed portion 34 of the light-transmitting medium 18 is between the base 20 and the light-absorbing medium 27.

Figure 2C:
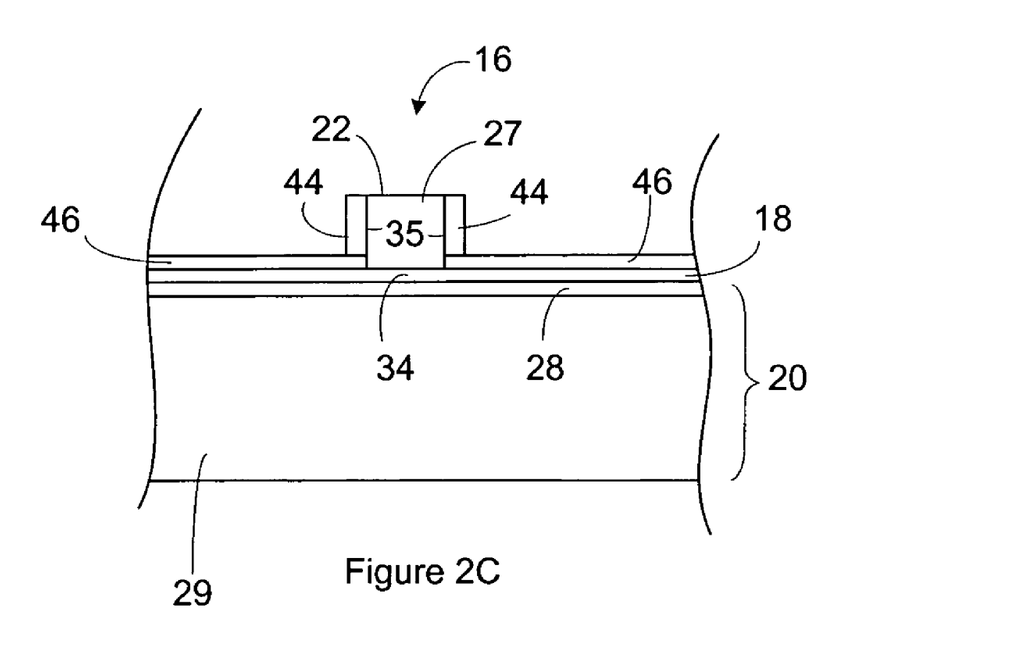
FIG. 2C is a cross section of an embodiment of a monitor that can be constructed on a waveguide having a structure constructed according to FIG. 1F.

As is evident from FIG. 2B, the electrical conductors 44 can contact the base 20. However, the electrical conductors 44 can be spaced apart from the base 20 as illustrated in FIG. 2C. The monitor or FIG. 2C can be constructed on the portion of the waveguide having a fourth structure constructed according to FIG. 1F. In FIG. 2C, a spacer layer 46 is formed on top of the light-transmitting medium 18 and against the lateral sides of the light-absorbing medium 27. The electrical conductors 44 extend from the top of the spacer layer 46 to the top side of the light-absorbing medium 27. As a result, the spacer layer 46 elevates the bottom of the electrical conductors 44 relative to the base 20. The electrical conductors 44 are also elevated above the interface between the light-absorbing medium 27 and the seed portion 34 of the light-transmitting medium 18. The elevation of the electrical conductors 44 reduces interaction between the resulting electrical field and the interface between the light-absorbing medium 27 and the seed portion 34 of the light-transmitting medium 18.

The monitor is configured such that during operation of the monitor, an electric field is applied to the light-absorbing medium 27 such that the electric field is substantially parallel to the base 20.

During operation of the monitor, a bias electrical field can be applied across the light-absorbing medium 27. While the bias electrical field is present, a portion of the waveguide acts as an input waveguide that guides a light signal to the light-absorbing medium 27 and to the monitor. The light-absorbing medium 27 absorbs a portion of the light signal (the absorbed portion of the light signal). Another portion of the light signal passes through the light-absorbing medium 27 (the transmitted portion of the light signal) and is received in an output portion of the waveguide. The output portion of the waveguide guides the transmitted portion of the light signal away from the monitor and can guide the light signal away from the light-absorbing medium 27. The absorption of the absorbed portion of the light signal by the light-absorbing medium 27 allows an electrical current to flow through the light-absorbing medium 27. As a result, the level of electrical current through the light-absorbing medium 27 indicates receipt of a light signal. Additionally, the magnitude of the current can indicate the power and/or intensity of the light signal.

Different light-absorbing meda 27 can absorb different wavelengths and are accordingly suitable for use in a monitor depending on the function of the monitor. A light-absorbing medium 27 that is suitable for detection of light signals used in communications applications includes, but are not limited to, silicon-germanium, silicon-germanium quantum well, and Ge. Silicon germanium is suitable for detection of light signals having wavelengths in a range of 1300 nm to 1600 nm. Examples of silicon-germanium include $Si_{1-x}Ge_x$ where x is greater than or equal to zero. In some instances, x is less than 1, or 0.9 and/or greater than 0, or 0.005. Changing the variable x can shift the range of wavelengths at which monitoring is most efficient. For instance, when x is 1, the monitor is suitable for a range of 1610-1640 nm. Decreasing the value of x can shift the range of wavelengths to lower values. For instance, an x of about 0.8 to 0.9 is suitable for monitoring in the c-band (1530-1565 nm). Accordingly, the value of x can be selected to be optimal for the wavelengths to be monitored.

Increasing the length of the portion of the waveguide that has the light-absorbing medium 27 (the light absorbing portion of the waveguide) causes a larger portion of the light signal to be absorbed. Since a light monitor is designed to tap only a portion of the light signal, the length of the light absorbing portion of the waveguide is selected such that the desired portion of the light signal is absorbed. For instance, in some instances, the length of the light absorbing portion of the waveguide is selected such that the light absorbing portion of the waveguide absorbs less than 95% of the light signal power, less than 20% of the light signal power or less than 15% of the light signal power.

The required length of the light-absorbing portion of the waveguide can also be influenced by the material used as the light-absorbing medium 27. For instance, the more efficiently that the light-absorbing medium 27 absorbs the light signals, the shorter that the light absorbing portion of the waveguide needs to be in order to absorb the desired fraction of the light signal. Germanium is highly efficient when used as the light-absorbing medium 27. As a result, when germanium is used as the light-absorbing medium 27 the length of the light-absorbing portion of the waveguide can be shorter than when other materials are used. However, when germanium is used as the light-absorbing medium 27 and the monitor is used for communications applications, the length of the length of the light-absorbing portion of the waveguide can be so small that the monitor is difficult to fabricate. For instance, when germanium is used as the light-absorbing medium 27 and the monitor is used for communications applications, the length of the light-absorbing portion of the waveguide can be as small as 0.1 µm. In some instances, the length of the light-absorbing portion of the waveguide is greater than 0.1 µm in order to provide more manageable fabrication dimensions. A less efficient light-absorbing medium 27 such as silicon-germanium ($Si_{1-x}Ge_x$ with x greater than 0) can be used in order to provide the light-absorbing portion of the waveguide with a length that is suitable for easy fabrication.

In one example, when the monitor is suitable for communications applications and the light-absorbing medium is silicon-germanium, the length of the light absorbing portion of the waveguide is greater than 0.5 µm, 1 µm, or 10 µm and/or less than 5 µm, 10 µm, 20 µm, 30 µm, or 50 µm. Communications applications currently employ wavelengths in a range of 1300 nm to 1600 nm. An example of the length of the light absorbing portion of the waveguide is labeled L in FIG. 1B. The illustrated length corresponds to the portion of the waveguide where the light-absorbing medium 27 extends across the width of the ridge. In another example, the length of the light absorbing portion of the waveguide is greater than 0.5 µm, 1 µm, or 10 µm and/or less than 5 µm, 10 µm, 20 µm, 30 µm, or 50 µm and is selected to absorb less than 95% of the light signal power, less than 50% of the light signal power, less than 20% of the light signal power, less than 15% of the light signal power, or less than 5% of the light signal power.

Figure 3:
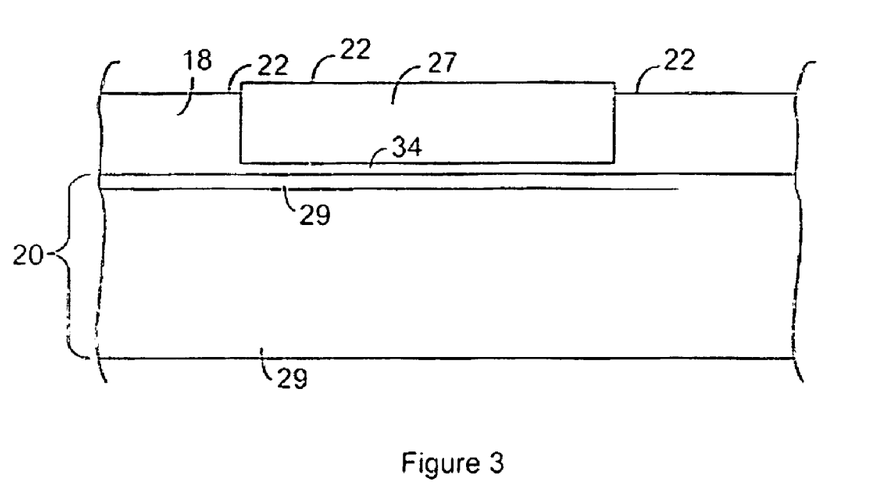
FIG. 3 is a cross section of an optical device with a monitor having a structure according to FIG. 1F taken through the longitude of the waveguide.

The top of the light-absorbing medium can be above the top of the adjacent portions of the waveguide. For instance, FIG. 3 is a cross section of the optical device taken through the longitude of the waveguide. The distance between the top of the light-absorbing medium 27 and the base is greater than the distance between the top of the adjacent light-transmitting medium 18. The reduced length of the monitor and accordingly the light-absorbing medium 27 means the amount of the divergence that occurs as the light signal travels through the light-absorbing medium 27 is also reduced. This reduced level of divergence reduces the level of optical loss that occurs as the light signal travels through the light-absorbing medium 27. Accordingly, the optical loss associated with the elevated height of the light-absorbing medium 27 may not be undesirably high. As will become evident below, the elevated height of the light-absorbing medium 27 can be a result of skipping planarization during fabrication of the device. As a result, the elevation of the light-absorbing medium 27 can simplify and/or reduce the costs of the fabrication process. Although FIG. 3 is shown using the fourth structure of FIG. 1F, the illustrated relationship between the tops of the light-absorbing medium 27 and the light-transmitting medium can be true in devices having fourth structures according to FIG. 1G through FIG. 2C. Further, the top of the light-absorbing medium need not be above the top of the adjacent portions of the waveguide. For instance, in some instances, the top of the light-absorbing medium 27 and the top of the adjacent portions of the waveguide can be at the same level relative to the base.

Strain can optionally be placed on the light-absorbing media 27 in other to shift the range of wavelengths at which monitoring is most efficient. For instance, increased tensile strain can shift the range of suitable monitoring wavelengths to longer wavelengths. A number of techniques can be employed to place strain on the light-absorbing medium 27. For instance, thermally induced strain can be created during the growth of the light-absorbing medium 27 on the seed portion 34 of the light-transmitting medium 18. In this case the strain results from the different lattice structures between the light-absorbing medium 27 and the seed portion 34. Additionally or alternately, a layer of strain-inducing material can be grown or deposited on the top of the light-absorbing medium 27. The strain-inducing medium can be selected such that the difference in the lattice structures of the light-absorbing medium 27 and the strain-inducing medium provide the strain on the strain-inducing medium. When the light-absorbing medium 27 is germanium-silicon, suitable strain-inducing media include, but are not limited to, dielectrics such as $SiO_2$, and SiN, and metals such as aluminum. The strain-inducing medium can contact the light-absorbing medium 27 but need not. For instance, the strain-inducing medium can be positioned on the bottom of the substrate 29. In this instance, the strain-inducing medium can be selected such that the difference in the lattice structures of the strain-inducing medium and the substrate 29 can cause the device to bend and accordingly strain the light-absorbing medium 27. When the substrate 29 is silicon, suitable strain-inducing media include, but are not limited to, dielectrics such as $SiO_2$, and SiN, and metals such as aluminum.

Increasing the portion of the lateral side of the ridge light-absorbing medium 27 that is contacted by the field source can increase the efficiency of the monitor. Accordingly, as is evident in FIG. 1A, FIG. 2B, and FIG. 2A, each of the field sources can span the distance between the top of the lateral side contacted by the field source and the bottom of the lateral side contacted by the field source. In some instances, each of the field sources extends from the top of the lateral side contacted by the field source toward the base 20. Alternately, each of the field sources can extend toward the base 20 from a location that is above 90% of a distance between the top of the lateral side contacted by the field source and the bottom of the lateral side contacted by the field source. Each of the field sources can extend toward the base 20 from a location that is above 80% of a distance between the top of the lateral side contacted by the field source and the bottom of the lateral side contacted by the field source. In one example, each of the field sources extends toward the base 20 from a location that is within 1.0 μm of a top of the lateral side contacted by that field source.

The width of the portion of the waveguide having the fourth structure can affect the performance of the monitor. The width of the waveguide or a portion of the waveguide refers to the width that defines the waveguide in that portion of the waveguide. For instance, the width of the top of the ridge of light-absorbing medium 27 in the monitor can affect response time. A narrower width can provide a faster response time. A suitable width for the top of the ridge of light-absorbing medium 27 in the monitor includes, but is not limited to, widths greater than 0.2 μm, 0.5 μm, and 0.75 μm, and/or less than 1.25 μm, 5 μm, and 10 μm. An example of a preferred width for the top of the ridge of light-absorbing medium 27 in the monitor is 1 μm.

Figure 4:
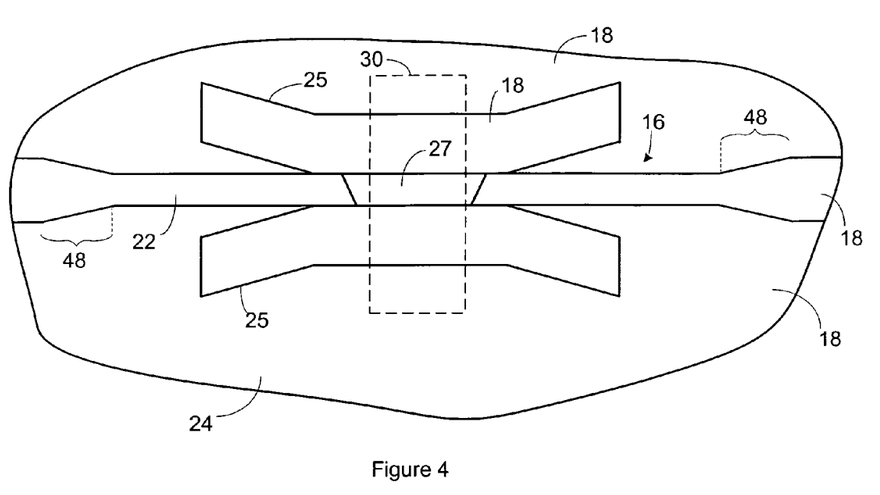
FIG. 4 is a topview of the optical device of FIG. 1B where the waveguide includes horizontal tapers and excludes vertical tapers.

The width of the waveguide can include horizontal tapers configured such that the light-absorbing medium 27 has the desired width in the monitor. For instance, FIG. 4 is a topview of an optical device where the waveguide 16 includes tapers 48. The tapers 48 can be a horizontal taper and need not include a vertical taper although a vertical taper is optional. One of the tapers 48 is positioned before the monitor and can taper the waveguide to the width that is desired for the light-absorbing medium 27 in the monitor. Another taper 48 is positioned after the monitor and can return the waveguide to the desired dimensions.

The horizontal tapers occur in the light-transmitting medium 18 rather than in the light-absorbing medium 27. The horizontal tapers can each be between a portion of the waveguide having the first structure and an expanded portion of the waveguide. The optical device preferably excludes additional components between the tapers and monitor although other components may be present.

The expanded portion of the waveguide can be either multi-mode or single mode. Additionally, the portions of the waveguide having the first structure can be single mode or multi-mode. The portions of the waveguide having the third structure can be multi-mode or single mode. However, even when the portions of the waveguide having the first structure are single mode, the portions of the waveguide having the third structure can become vertically multimode as a result of the ridge having an increased height relative to the height of the ridge in the portions of the waveguide having the first structure. In general, the portion of the waveguide having the fourth structure is single mode when the portions of the waveguide having the third structure are single mode and the portion of the waveguide having the fourth structure is multi-mode when the portions of the waveguide having the third structure are multi-mode.

In view of the above, the portions of the waveguide having the second structure can be a transition between a portion of the waveguide that is single mode and a portion of the waveguide that is at least vertically multi-mode. For instance, in one example, the first structure is single mode, the second structure is a transition between single mode and multi-mode, the third structure is multi-mode, and the fourth structure is multi-mode. In these instances, the distance between the recess and the ridge can taper so as to reduce excitation of higher order modes during this transition. For instance, the distance between the recess and the ridge can provide an adiabatic taper. In instances, where the portions of the waveguide having the second structure do not provide a transition between a portion of the waveguide that is single mode and a portion of the waveguide that multi-mode, the distance between the recess and the ridge can also taper so as to reduce excitation of higher order modes.

Since the electrical field that forms as a result of using the above structures is substantially parallel to the base, changing the height of the light-absorbing medium 27 in the monitor does not substantially affect the photocurrent response. As a result, there is no need for a vertical taper between large dimension waveguides and the monitor. Accordingly, the portions of the waveguide having the second structures, the third structures and the fourth structure can each exclude a vertical taper.

As noted above, the monitor is suitable for use with waveguide dimensions that are suitable for use in communications applications. Accordingly, a suitable height (distance between top of ridge 22 and the base) for the potion of the waveguide 16 having the first structure (FIG. 1C) includes, but is not limited to, heights greater than 1 µm, 2 µm, and 3 µm. A suitable width of the ridge for the portion of the waveguide 16 having the first structure (FIG. 1C) includes, but is not limited to, widths greater than 0.25 µm, 0.5 µm, and 0.75 µm.

Since the portions of the waveguide having the second structures, the third structures and the fourth structure can each exclude a vertical taper, the height (distance between top of ridge 22 and the base) of each of these portions of the waveguide can be about the same. In some instance, the height (distance between top of ridge 22 and the base) of the portions of the waveguide having the first structure is the same as the height of the second structures, the third structures and the fourth structure. Alternately, as discussed above, the top of the light-absorbing medium 27 can be above the remainder of the waveguide.

A suitable depth for the recesses to extend into the slab region of the light-transmitting medium includes but is not limited to, depths greater than 1.5 µm, 2.5 µm, and 2.8 µm and/or less than 3.0 µm, 4 µm, and 4.5 µm. A suitable height for the ridge (distance between the top of the ridge and the top of the slab portions of the light-transmitting medium) in the portions of the waveguide having the first structure include, but are not limited to, heights greater than 0.5 µm, 0.8 µm, and 1.2 µm, and/or less than 1.5 µm, 2.0 µm, and 3.0 µm.

The optical device can be constructed using fabrication technologies that are employed in the fabrication of integrated circuits, optoelectronic circuits, and/or optical devices. FIG. 5A through FIG. 14 illustrate a method of forming an optical device having a monitor constructed according to FIG. 1A through FIG. 1F, and FIG. 1J. The method is illustrated using a silicon-on-insulator wafer or chip as the starting precursor for the optical device. However, the method can be adapted to platforms other than the silicon-on-insulator platform.

Figure 5A:
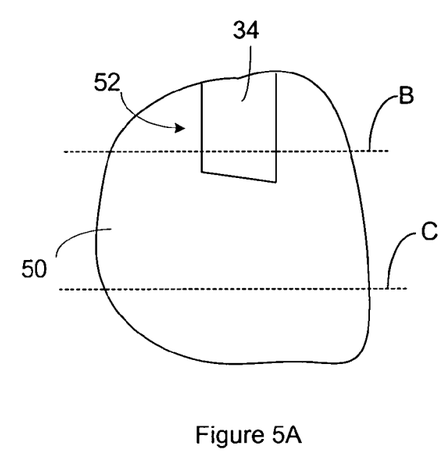
Figure 5B:
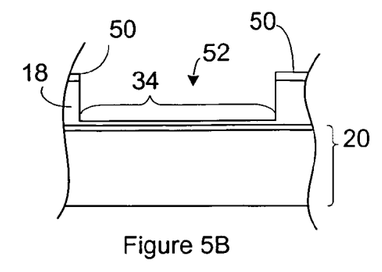
Figure 5C:
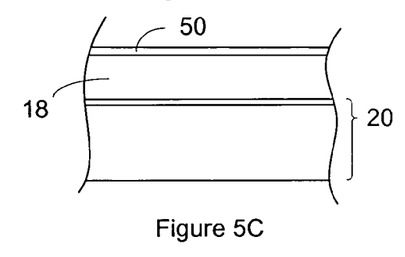

FIG. 5A through FIG. 5C illustrate a first mask 50 formed on the silicon-on-insulator wafer or chip to provide a device precursor. FIG. 5A is a topview of the device precursor. FIG. 5B is a cross-section of the device precursor shown in FIG. 5A taken along the line labeled B. FIG. 5C is a cross-section of the device precursor shown in FIG. 5A taken along the line labeled C. The first mask 50 leaves exposed a region of the device precursor where a light-absorbing cavity 52 is to be formed while the remainder of the illustrated portion of the device precursor is protected. The light-absorbing cavity 52 is the region of the device precursor where the light-absorbing medium will to be formed. A first etch is then performed so as to form the light-absorbing cavity 52. The first etch yields the device precursor of FIG. 5A through FIG. 5C. The first etch is performed such that the seed portion 34 of the light-transmitting medium 18 remains on the base 20. Accordingly, the first etch is terminated before the base 20 is reached.

A suitable first mask 50 includes, but is not limited to, a hard mask such as a silica mask. A suitable first etch includes, but is not limited to, a dry etch.

Figure 6A:
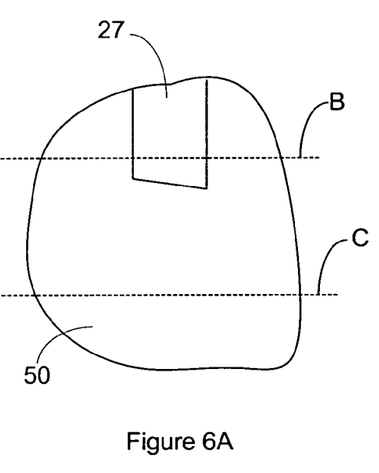
Figure 6B:
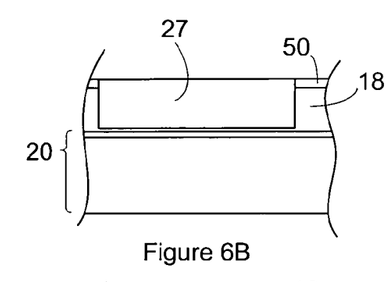
Figure 6C:
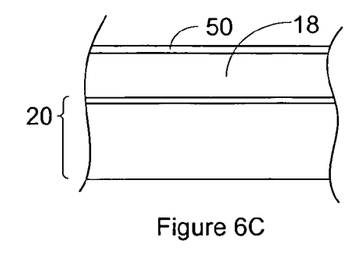

As shown in FIG. 6A through FIG. 6C, the light-absorbing medium 27 is formed in the sensor cavity 52 of FIG. 5A through FIG. 5C. FIG. 6A is a topview of the device precursor. FIG. 6B is a cross-section of the device precursor shown in FIG. 6A taken along the line labeled B. FIG. 6C is a cross-section of the device precursor shown in FIG. 6A taken along the line labeled C. When the light-transmitting medium 18 is silicon and the light-absorbing medium 27 is germanium or germanium-silicon, the light-absorbing medium 27 can be grown on the seed portion 34 of the silicon. After formation of the light-absorbing medium 27, the first mask 50 can be removed and the device precursor can be planarized. Suitable methods for polishing include, but are not limited to, a chemical-mechanical polishing (CMP) process. As an alternative, the first mask 50 can be removed and the planarized not performed in order to provide a device having the structure shown in FIG. 3. This allows a step such as the CMP step to be skipped. Since CMP processes and EPI growth can be non-compatible processes, the ability to skip the CMP step can permit other fabrication options.

Figure 7A:
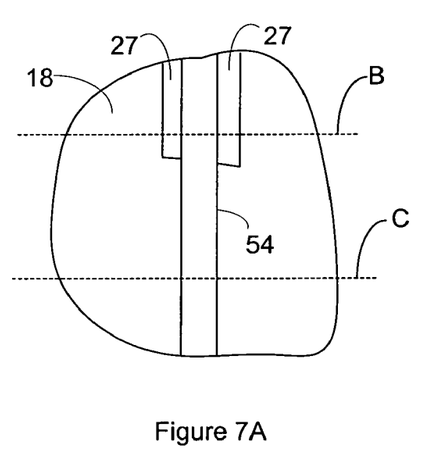
Figure 7B:
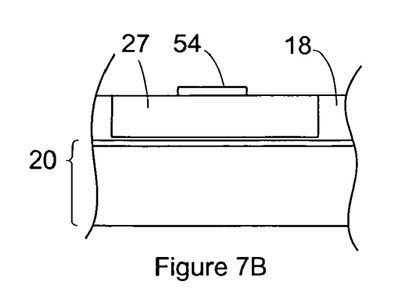
Figure 7C:
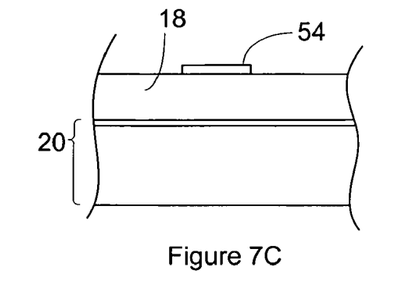

A second mask 54 can be formed on the device precursor so as to provide the device precursor of FIG. 7A through FIG. 7C. FIG. 7A is a topview of the device precursor. FIG. 7B is a cross-section of the device precursor shown in FIG. 7A taken along the line labeled B. FIG. 7C is a cross-section of the device precursor shown in FIG. 7A taken along the line labeled C. The second mask 54 is formed such that the regions where the ridge of the waveguide is to be formed is protected while the remainder of the illustrated portion of the device precursor remains exposed. A suitable second mask 54 includes a hard mask such as a silica mask.

Figure 8A:
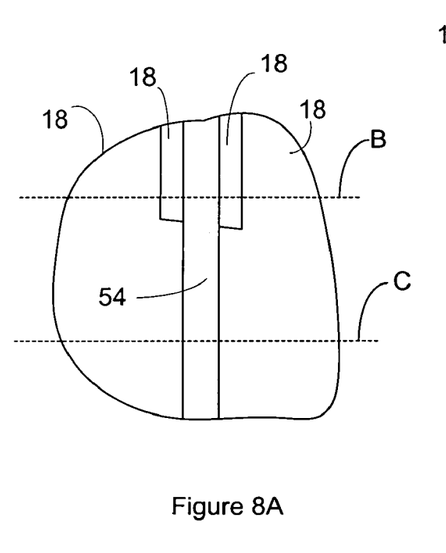
Figure 8B:
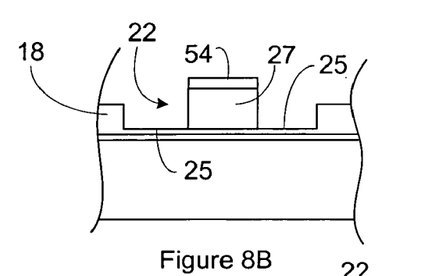
Figure 8C:
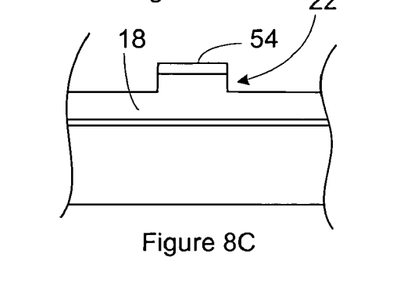

A second etch is performed on the device precursor of FIG. 7A through FIG. 7C to provide the device precursor of FIG. 8A through FIG. 8C. FIG. 8A is a topview of the device precursor. FIG. 8B is a cross-section of the device precursor shown in FIG. 8A taken along the line labeled B. FIG. 8C is a cross-section of the device precursor shown in FIG. 8A taken along the line labeled C. Since the second etch etches the light-transmitting medium 18 and the light-absorbing medium 27 concurrently, the second etch etches the light-transmitting medium 18 and the light-absorbing medium 27 to different depths. For instance, FIG. 8B illustrates the light-absorbing medium 27 etched deeper than the light-transmitting medium 18. The second etch is performed through the light-absorbing medium 27 positioned on either side of the ridge 22 down to the underlying light-transmitting medium 18. A suitable second etch includes, but is not limited to, a dry etch that can etch both the light-transmitting medium 18 and the light-absorbing medium 27.

Figure 9A:
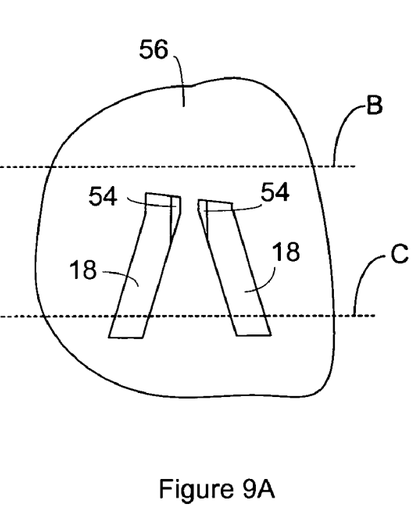
Figure 9B:
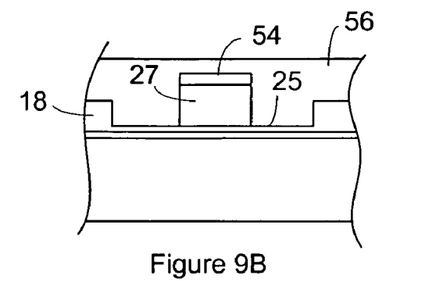
Figure 9C:
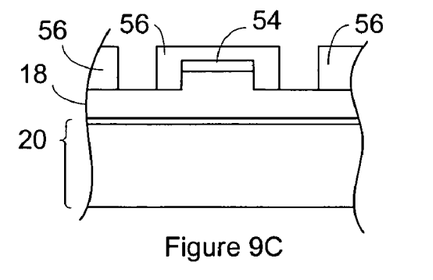

A third mask 56 is formed on the device precursor of FIG. 8A through FIG. 8C as shown by the device precursor of FIG. 9A through FIG. 9C. FIG. 9A is a topview of the device precursor. FIG. 9B is a cross-section of the device precursor shown in FIG. 9A taken along the line labeled B. FIG. 9C is a cross-section of the device precursor shown in FIG. 9A taken along the line labeled C. Portions of the third mask 56 are formed over the second mask 54. The third mask 56 is formed such that the locations on the device precursor where taper portions of the recesses are to be formed remain exposed while the remaining regions of the illustrated portion of the device precursor are protected. The taper portions of the recesses are the portions of the recesses that are spaced apart from the ridge 22.

Figure 10A:
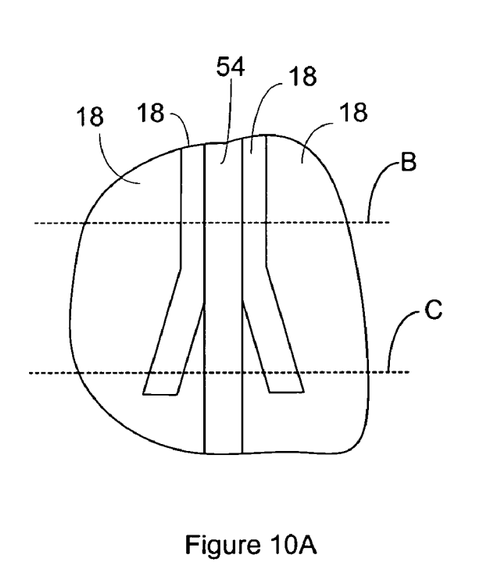
Figure 10B:
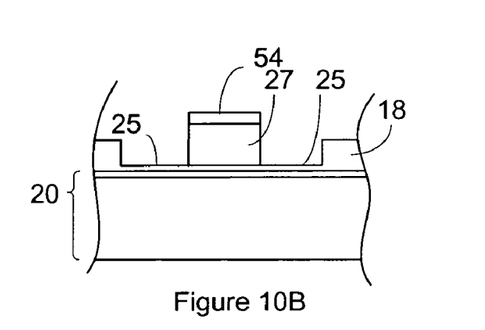
Figure 10C:
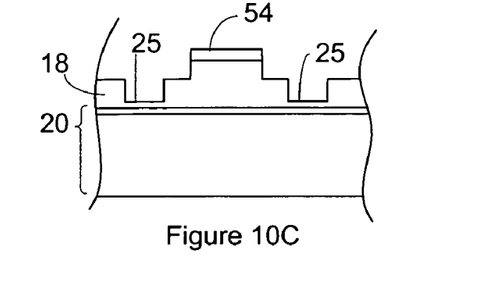

A third etch is then performed so as to provide the device precursor of FIG. 10A through FIG. 10C. FIG. 10A is a topview of the device precursor. FIG. 10B is a cross-section of the device precursor shown in FIG. 10A taken along the line labeled B. FIG. 10C is a cross-section of the device precursor shown in FIG. 10A taken along the line labeled C. The third etch is performed to about the depth to which the light-absorbing medium 27 was etched during the second etch. As a result, the third etch forms the taper portions of the recesses 25.

A suitable third mask 56 includes, but is not limited to, a photoresist. A suitable third etch includes, but is not limited to, a dry etch.

Figure 11A:
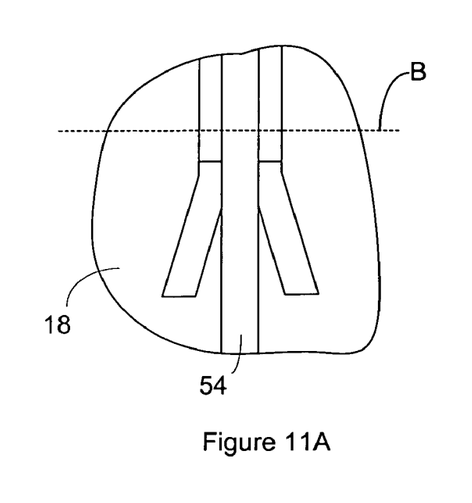
Figure 11B:
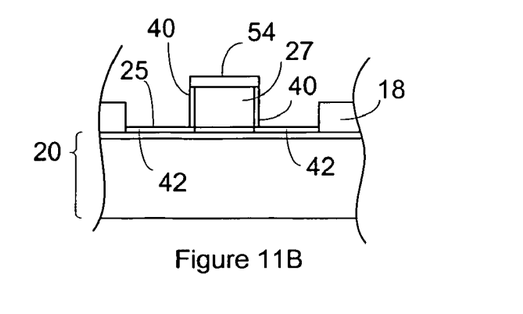

The third mask 56 is removed and doped regions 40, 42 are formed in the light-transmitting medium 18 and in the light-absorbing medium 27 so as to provide the device precursor of FIG. 11A and FIG. 11B. FIG. 11A is a topview of the device precursor. FIG. 11B is a cross-section of the device precursor shown in FIG. 11A taken along the line labeled B. The n-type doped regions can be generated by forming a doping mask on the device precursor so the locations of the n-type doped regions are exposed and the remainder of the illustrated portion of the device precursor is protected. High angle dopant implant processes can be employed to form the n-type doped regions. The doping mask can then be removed. The same sequence can then be employed to form the p-type doped regions. The p-type doped regions can be formed before the n-type doped regions or the n-type doped regions can be formed before the p-type doped regions.

Figure 12:
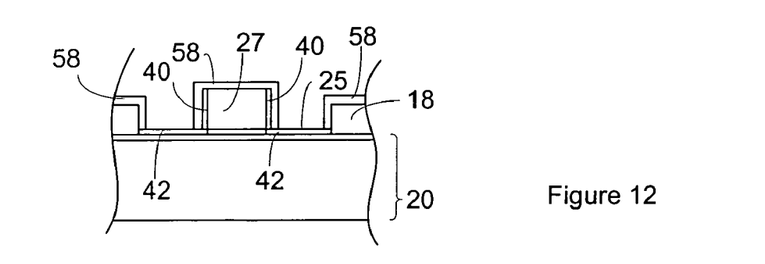

The second mask 54 is removed from the device precursor of FIG. 11A and FIG. 12B and a first cladding 58 is formed on the device precursor so as to provide the device precursor of FIG. 12. FIG. 12 is a cross section of the device precursor through the region where the monitor is being formed such as the cross section of FIG. 11B. The first cladding 58 is formed such that the portion of the doped regions 42 that are to be contacted by the electrical conductors 44 remain exposed and the remainder of the illustrated portion of the device precursor are protected by the first cladding 58. A suitable first cladding 58 includes, but is not limited to, PECVD deposited silica that is subsequently patterned using photolithography.

Figure 13:
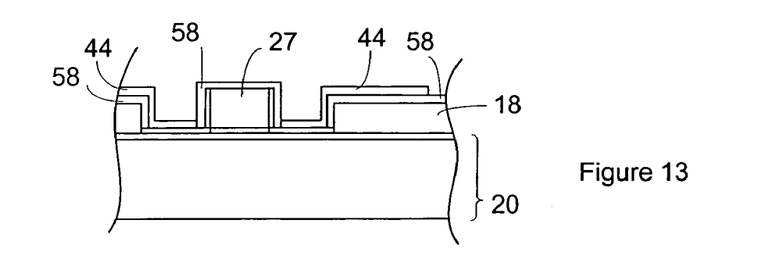

The electrical conductors 44 are formed on the device precursor of FIG. 12 so as to provide the device precursor of FIG. 13. FIG. 12 is a cross section of the device precursor through the region where the monitor is being formed such as the cross section of FIG. 11B. The electrical conductors 44 can be formed so each electrical conductor 44 extend from one of the doped regions 42, out of the recess 25, and over the light-transmitting medium 18. Suitable electrical conductors 44 include metals such as titanium and aluminum. The metals can be deposited by sputtering and patterned by photolithography.

Figure 14:
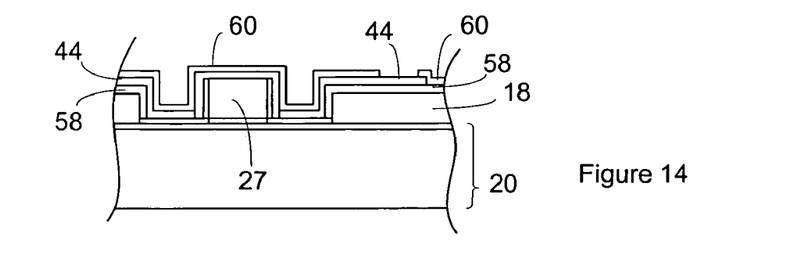

A second cladding 60 can optionally be formed on the device precursor of FIG. 13 so as to provide the device precursor of FIG. 14. FIG. 12 is a cross section of the device precursor through the region where the monitor is being formed such as the cross section of FIG. 11B. As is evident in FIG. 14, the second cladding 60 can be patterned such that the second cladding 60 defines contact pads the electrical conductors 44. A suitable second cladding 60 includes, but is not limited to, PECVD deposited SiN that is subsequently patterned using photolithography. After removing photoresists formed during photolithography, the device precursor of FIG. 14 can be sintered to form the optical device.

In some instances, the device are used in conjunction with electronics that are in electrical communication with the contact pads. The electronics can apply electrical energy to the contact pads. Suitable electronics for operating the above monitors can include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The electronics can optionally include a memory in communication with the controller. The electronics can store data for executing the functions of the electronics in the memory. The memory can be any memory device or combination of memory devices suitable for read and/or write operations.

In some instances, the electronics include a computer-readable medium in communication with the controller. The computer-readable medium can have a set of instructions to be executed by the controller. The controller can read and execute instructions included on the computer-readable medium. The controller executes the instructions such that the electronics perform one or more of the described functions. The computer-readable medium cab be different from the memory or can be the same as the memory. Suitable computer-readable media include, but are not limited to, optical discs such as CDs, magnetic storage diskettes, Zip disks, magnetic tapes, RAMs, and ROMs. Some functions of the electronics may be executed using hardware as opposed to executing these functions in firmware and/or software.

The method of FIG. 5A through FIG. 14 can be adapted to form the other embodiment disclosed above. For instance, the structure of FIG. 1G can be generated by performing the second etch through the light-absorbing medium 27 positioned on either side of the ridge 22, and through the underlying light-transmitting medium 18 down to the base 20. Alternately, the structure of FIG. 1H can be generated by stopping the second etch before etching through the light-absorbing medium 27 positioned on either side of the ridge 22, and leaving a layer of the light-absorbing medium 27 on the underlying light-transmitting medium 18.

Although a portion of the waveguide is described above as an input waveguide and another portion of the waveguide is described as an output waveguide, the optical device can be operated in reverse. For instance, the output waveguide can be employed to carry light signals to the monitor and the input waveguide can be employed to carry the transmitting portion of the waveguide away from the monitor.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a waveguide on a base, the waveguide including an input portion, a light-absorbing portion, and an output portion,
the input portion of the waveguide configured to guide a light signal to the light-absorbing portion of the waveguide and being partially defined by a light-transmitting medium that includes a top side that defines a portion of the input portion of the waveguide,
the light-absorbing portion of the waveguide configured to absorb a portion of the light signal and to guide a transmitted portion of the light signal to the output portion of the waveguide, and the light-absorbing portion of the waveguide being partially defined by a light-absorbing medium that is different from the light-transmitting medium and a bottom side of the light-absorbing medium being between the base and a top side of the light-absorbing medium,
the top side of the light-transmitting medium being less far from the base than the top side of the light-absorbing medium but further from the base than the bottom side of the light-absorbing medium, the output portion of the waveguide configured to receive the transmitted portion of the light signal from the light-absorbing portion of the waveguide and to guide the transmitted portion of the light signal away from the light-absorbing portion of the waveguide, and the output portion of the waveguide and being partially defined by the light-transmitting medium; and a monitor positioned on the base and configured to monitor absorption of the absorbed portion of the light signal.

2. The device of claim 1, wherein the light-absorbing portion of the waveguide has a length selected such that a power of the absorbed portion of the light signal is less than 20% of the power of the light signal and has a length less than 5 μm.

3. The device of claim 1, wherein the light-absorbing portion of the waveguide has a length selected such that a power of the absorbed portion of the light signal is less than 5% of the power of the light signal and has a length less than 1 μm.

4. The device of claim 1, wherein the light-transmitting medium is silicon and the light-absorbing medium is germanium-silicon represented by $Si_{1-x}Ge_x$ where x is greater than zero.

5. The device of claim 4, wherein x is between 0.005 and 1.

6. The device of claim 1, wherein the light-absorbing medium has lateral sides that each extends between the top side of the light-absorbing medium and the bottom side of the light-absorbing medium, the monitor includes field sources that are each configured to serve as sources of an electrical field in the light-absorbing medium, the field sources each contacting one of the lateral sides and the lateral sides that are contacted by the field sources being on opposing sides of the light-absorbing medium.

7. The device of claim 6, wherein each of the lateral sides contacted by one of the field sources is perpendicular to the base.

8. The device of claim 6, wherein the light-transmitting medium and the light-absorbing medium contact one another at an interface, the interface being configured such that the light signal travels through the interface, the interface being at a non-perpendicular angle relative to a direction of propagation of the light signals through the waveguide at the interface.

9. The device of claim 8, wherein the angle is between 80° and 89°.

10. The device of claim 6, wherein the field sources are each a doped region of the light-absorbing medium.

11. The device of claim 6, wherein the field sources are each a metal.

12. The device of claim 6, wherein a seed portion of the light-transmitting medium is positioned between the light-absorbing medium and the base, the light-absorbing medium contacts the seed portion of the light-transmitting medium, and each field source is positioned such that a lowest part of the metal included in the field source is above the seed portion of the light-transmitting medium.

13. The device of claim 6, wherein each of the field sources spans a distance between a top of the lateral side contacted by the field source and the bottom of the lateral side contacted by the field source.

14. The device of claim 6, wherein each of the field sources extends from a top of the lateral side contacted by the field source toward the base.

15. The device of claim 6, wherein each of the field sources extends toward the base from a location that is above 90% of a distance between a top of the lateral side contacted by the field source and the bottom of the lateral side contacted by the field source.

16. The device of claim 7, wherein the monitor includes a ridge extending from slab regions positioned on opposing sides of the ridge and the light-absorbing medium is included in the ridge and also in the slab regions.

17. The device of claim 16, wherein the doped regions are positioned on opposing sides of the ridge.

18. The device of claim 16, wherein the light-absorbing medium included in each slab region is continuous with the light-absorbing medium included in the ridge.

19. The device of claim 16, wherein the field sources are each a doped region of the light-absorbing medium and one or more doped regions is each included in both the ridge and one of the slab regions.

20. An optical device, comprising:

a waveguide on a base, the waveguide including an input portion, a light-absorbing portion, and an output portion, the input portion of the waveguide configured to guide a light signal to the light-absorbing portion of the waveguide and being partially defined by a light-transmitting medium that includes a top side that defines a portion of the input portion of the waveguide, the light-absorbing portion of the waveguide configured to absorb a portion of the light signal and to guide a transmitted portion of the light signal to the output portion of the waveguide, and the light-absorbing portion of the waveguide being partially defined by a light-absorbing medium that is different from the light-transmitting medium, the light-absorbing medium has lateral sides that each extends between a top side and a bottom side of the light-absorbing medium, the bottom side being between the base and the top side of the light-absorbing medium, the output portion of the waveguide configured to receive the transmitted portion of the light signal from the light-absorbing portion of the waveguide and to guide the transmitted portion of the light signal away from the light-absorbing portion of the waveguide, and the output portion of the waveguide and being partially defined by the light-transmitting medium; and a monitor positioned on the base and configured to monitor absorption of the absorbed portion of the light signal, the monitor including field sources that are each configured to serve as a source of an electrical field in the light-absorbing medium, the field sources each contacting one of the lateral sides and the lateral sides that are contacted by the field sources being on opposing sides of the light-absorbing medium, and the top side of the light-transmitting medium being less far from the base than the top side of the light-absorbing medium but further from the base than the bottom side of the light-absorbing medium.

* * * * *